(No Model.)

C. H. TAYLOR.
MACHINE FOR WORKING, FLESHING, AND UNHAIRING HIDES.

No. 249,114. Patented Nov. 1, 1881.

Witnesses.

Inventor.
Charles H. Taylor.
by Attorney,

United States Patent Office.

CHARLES H. TAYLOR, OF WOBURN, MASSACHUSETTS, ASSIGNOR OF ONE-HALF TO JAMES BUEL, OF SAME PLACE.

MACHINE FOR WORKING, FLESHING, AND UNHAIRING HIDES.

SPECIFICATION forming part of Letters Patent No. 249,114, dated November 1, 1881.

Application filed September 14, 1881. (No model.)

*To all whom it may concern:*

Be it known that I, CHARLES H. TAYLOR, a citizen of the United States, residing at Woburn, in the county of Middlesex and State of Massachusetts, have invented certain new and useful Improvements in Machines for Fleshing, Unhairing, and Working Hides, &c.; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention is in the nature of mechanism for effecting the operations of fleshing, unhairing, and working hides, calf-skins, pelts, and other skins in the raw or green state.

The invention consists in a rotary tool-stock for carrying and operating the slickers, stones, blades, or other tools necessary to effect the desired treatment of the skin, combined with a traveling carriage for holding the skin and presenting every portion of its surface to the action of the tools, the skin during its treatment overlying a bed, which is preferably supported upon springs, so as to yield to any obstructions encountered by the tools in working the hides, &c., all substantially as hereinafter specifically set forth and claimed.

Figure 1:
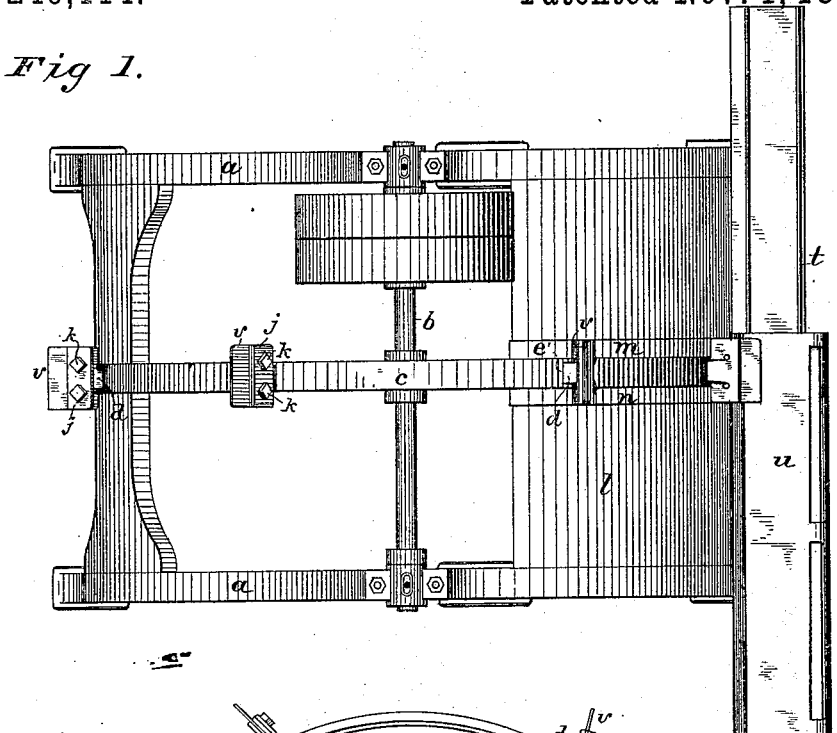
Figure 2:
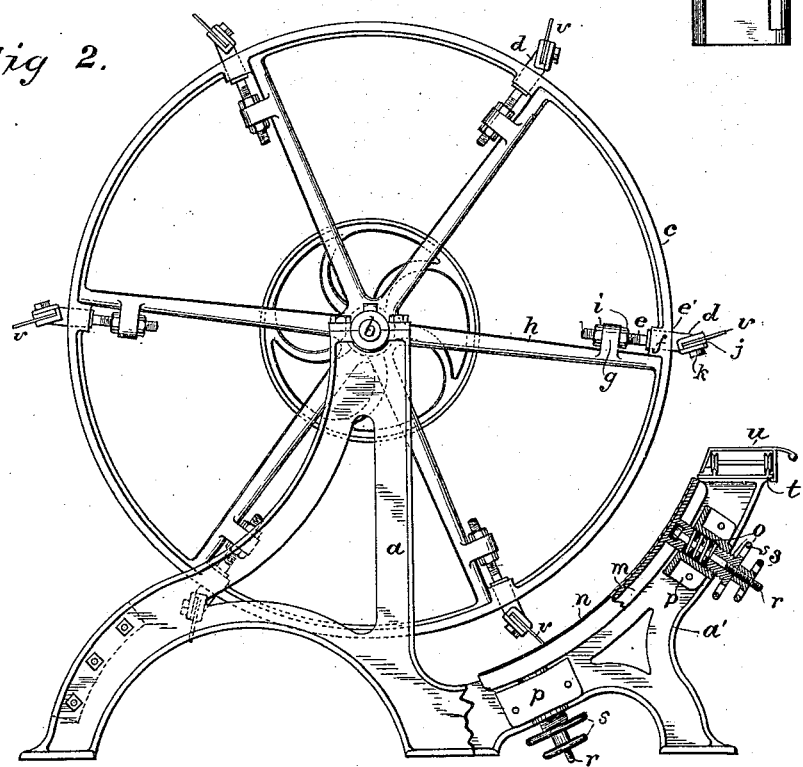

In the accompanying drawings, illustrating my invention, in the two figures of which like parts are similarly designated, Figure 1 is a top-plan view, and Fig. 2 is a side elevation, of my improved apparatus, partly in section.

In a suitable frame-work, $a$, I mount a shaft, $b$, having suitable power appliances. Upon this shaft I secure a wheel or tool-stock, $c$, having a number of tool-clamps, $d$, arranged about its rim. These clamps consist, in the present instance, of screw-spindles $e$, with squared heads $e'$, seated against rotation in squared holes or sockets in bosses $f$ in the rim of the wheel or stock, and secured by their tails in lugs $g$ on the wheel spokes or arms $h$ by nuts $i$. Each spindle has its head flattened and extended laterally to receive the tool $v$—viz., slicker, stone, blade, or other implement—the tool being held and secured therein by suitable clamping devices, as a plate, $j$, and bolts or screws $k$. The tool stock or wheel is provided with any desired or convenient number of these tool clamps or holders.

The tool-fastening and the construction and arrangement of the tool-spindle just described may be variously modified, or other constructions may be employed without departing from the spirit of my invention.

A portion of the frame $a'$ is projected upwardly on the circle of the wheel, and the concavity of this projection of the frame is covered with a table, $l$. Within a slot in this table is arranged a bed, $m$, the surface of which is covered with a soft fabric, $n$—such as rubber cloth, felt, or other fabric—to break the force of the blow of the tools upon the skin being treated, and to prevent the breaking of the skin. In order to make this bed still more yielding, it is arranged upon springs $o$, which are confined in sockets $p$ on the frame $a'$, said springs projecting out of the open ends of the sockets next adjacent the under side of the bed, and bearing thereupon with a tendency to press the bed toward the wheel. The bed is held adjustably in place by means of screw-bolts $r$, secured thereto, and passing through the sockets and retained by jam-nuts $s$, whereby also the position and resilience of the bed may be regulated.

Upon the top of the projecting frame $a'$, and above the table $l$, are arranged tracks or ways $t$, which receive a traveling carriage, $u$, upon which the skin or pelt to be treated is supported, and by which such skin or pelt is moved progressively over the bed $m$, under the operation of the tools on the revolving wheel, to treat every part of the said skin or pelt. This carriage may have any suitable fastening devices for retaining a skin, and may be further provided with suitable handles or other conveniences for moving it upon its ways.

The operation of the machine is as follows: The tools necessary for the operation to be performed—viz., fleshing, unhairing, or working the hides, &c.—having been placed in their holders, the wheel is rotated by power or otherwise, and the hide, skin, or pelt having been placed upon the carriage, its near edge is moved over the bed $m$ and there subjected to the action of the tools, the said skin being progressively moved over the bed as each portion is treated until the work is completed.

The rubber face of the bed and its springs render said bed sufficiently resilient to admit of the tools passing over any obstruction or extraordinary thickness in the skin without damage.

The tools are set at an angle or tangentially to the wheel's rim, in their holders, in order the better to perform their necessary work.

What I claim is—

1. In a machine for operating on pelts, &c., a revolving tool-stock provided with tools about its rim, combined with the bed $m$, to receive the pelt, skin, or hide to be operated upon, the table $l$, in which said bed is arranged, sockets $p$, springs $o$, rods $r$, and jam-nuts $s$, substantially as described.

2. In a machine for operating on pelts, &c., a revolving tool-stock provided with tools about its rim, combined with the frame $a$, its extension $a'$, the table $l$, and yielding bed $m$, to receive the pelt, skin, or hide to be operated upon, and the carriage $u$, to progressively move such pelt, skin, or hide over said bed, the said table, bed, and carriage being sustained by the extension $a'$, substantially as described.

3. The tool-stock $c$, provided with tool-spindles $e$, socketed in its rim, so as to prevent rotation of such spindles on their longitudinal axes, and rigidly held from longitudinal movement by means of the lugs $g$ and nuts $i$, substantially as shown and described.

4. A frame, $a$, and a rotary tool-stock provided with tools supported upon said frame, combined with an extension, $a'$, of said frame, projecting upwardly in an arc concentric with the tool-stock, a curved table fixed to said extension, a yielding bed arranged in said table, and a carriage movable upon ways affixed to said extension, the construction being and operating substantially as shown and described.

In testimony whereof I affix my signature in presence of two witnesses.

CHARLES H. TAYLOR.

Witnesses:
  BESSIE R. SESQUEREUX,
  WILLIAM P. DEFRIEZ.